US009312583B2

United States Patent
Lee et al.

(10) Patent No.: US 9,312,583 B2
(45) Date of Patent: Apr. 12, 2016

(54) PROTECTED ANODE FOR LITHIUM AIR BATTERY AND LITHIUM AIR BATTERY INCLUDING THE SAME

(71) Applicants: SAMSUNG ELECTRONICS CO., LTD., Suwon-si, Gyeonggi-do (KR); NATIONAL UNIVERSITY CORPORATION MIE UNIVERSITY, Tsu, Mie Prefecture (JP)

(72) Inventors: Dong-joon Lee, Yongin-si (KR); Dong-min Im, Seoul (KR); Victor Roev, Suwon-si (KR); Sang-bok Ma, Suwon-si (KR); Min-sik Park, Hwaseong-si (KR); Osamu Yamamoto, Tsu (JP); Nobuyuki Imanishi, Tsu (JP); Won-sung Choi, Yongin-si (KR); Yasuo Takeda, Tsu (JP)

(73) Assignees: SAMSUNG ELECTRONICS CO., LTD. (KR); NATIONAL UNIVERSITY CORPORATION MIE UNIVERSITY (JP)

( * ) Notice: Subject to any disclaimer, the term of this patent is extended or adjusted under 35 U.S.C. 154(b) by 342 days.

(21) Appl. No.: 13/870,646

(22) Filed: Apr. 25, 2013

(65) Prior Publication Data

US 2014/0178775 A1 Jun. 26, 2014

(30) Foreign Application Priority Data

Dec. 21, 2012 (KR) .................. 10-2012-0151343

(51) Int. Cl.
*H01M 4/36* (2006.01)
*H01M 12/08* (2006.01)
*H01M 2/16* (2006.01)
*H01M 10/0562* (2010.01)
*H01M 10/0565* (2010.01)
*H01M 10/0568* (2010.01)
*H01M 10/052* (2010.01)
*H01M 4/02* (2006.01)

(52) U.S. Cl.
CPC ............ *H01M 12/08* (2013.01); *H01M 2/1686* (2013.01); *H01M 10/0562* (2013.01); *H01M 10/0565* (2013.01); *H01M 10/0568* (2013.01); *H01M 10/052* (2013.01); *H01M 2004/027* (2013.01); *H01M 2300/0094* (2013.01); *Y02E 60/50* (2013.01)

(58) Field of Classification Search
CPC .......... H01M 2/1686; H01M 10/0565; H01M 10/0568; H01M 10/0562
USPC ........................................................ 429/405
See application file for complete search history.

(56) References Cited

U.S. PATENT DOCUMENTS

| 7,026,071 B2 | 4/2006 | Mayes et al. |
| 2009/0286163 A1 | 11/2009 | Shin et al. |
| 2012/0107701 A1 | 5/2012 | Iwaya |

FOREIGN PATENT DOCUMENTS

| JP | 2011238404 | 11/2011 |
| JP | 2011239404 A | 11/2011 |
| KR | 1020030035521 A | 5/2003 |
| KR | 1020110136210 A | 12/2011 |
| KR | 1020120092918 A | 8/2012 |

OTHER PUBLICATIONS

J. Hassoun et al., Investigation of the O2 Electrochemistry in a Polymer Electrolyte Solid-State Cell, Angewandte Chemie Int. Ed. 2011, 50, pp. 2999-3002.

*Primary Examiner* — Edward Cain
(74) *Attorney, Agent, or Firm* — Cantor Colburn LLP (57) ABSTRACT

A protected anode for lithium air batteries and a lithium air battery including the protected anode are provided. The protected anode includes: an anode intercalates and deintercalates lithium ions; a lithium ion-conductive solid electrolyte membrane; and a polymer electrolyte disposed between the anode and the ion-conductive solid electrolyte membrane, wherein the polymer electrolyte includes a lithium ion-conductive polymer, a compound represented by Formula 1 having a number average molecular weight from about 300 to about 1,000, and a lithium salt, and an amount of the compound of Formula 1 is from about 10 parts to about 25 parts by weight based on 100 parts by weight of the polymer electrolyte:

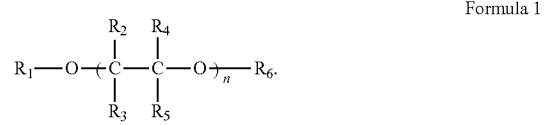

Formula 1

In Formula 1, $R_1$ to $R_6$, and n are the same as defined in the specification.

16 Claims, 4 Drawing Sheets

PROTECTED ANODE FOR LITHIUM AIR BATTERY AND LITHIUM AIR BATTERY INCLUDING THE SAME

CROSS-REFERENCE TO RELATED APPLICATIONS

This application claims priority to Korean Patent Application No. 10-2012-0151343, filed on Dec. 21, 2012, and all the benefits accruing therefrom under 35 U.S.C. §119, the content of which in its entirety is herein incorporated by reference.

BACKGROUND

1. Field

This disclosure relates to a protected anode for lithium air batteries, and a lithium air battery including the protected anode.

2. Description of the Related Art

A lithium air battery includes an anode capable of intercalating and deintercalating lithium ions, a cathode including oxygen as a cathode active material and a catalyst for oxidizing or reducing oxygen, and a lithium ion-conducting medium disposed between the cathode and the anode.

Lithium air batteries have a theoretical energy density of about 3000 Wh/kg or greater, which is equivalent to about ten times that of lithium ion batteries. Furthermore, due to being environmentally friendly and safer in use than lithium ion batteries, lithium air batteries are of increasing importance and are actively being developed.

However, the growth of lithium dendrites on anode surfaces of a lithium air battery may deteriorate performance, and may increase interfacial resistance between the anode and a layer adjacent to the anode. Therefore, there is a demand for further improvements in this regard.

SUMMARY

Provided are a protected anode for a lithium air battery using an electrolyte suppressing the growth of lithium dendrite, and a lithium air battery using the protected anode to have improved cell performance.

Additional aspects will be set forth in part in the description which follows and, in part, will be apparent from the description, or may be learned by practice of the presented embodiments.

According to an aspect of the present disclosure, a protected anode includes: an anode that intercalates and deintercalates lithium ions; a lithium ion-conductive solid electrolyte membrane; and a polymer electrolyte disposed between the anode and the ion-conductive solid electrolyte membrane, wherein the polymer electrolyte includes a lithium ion-conductive polymer, a compound represented by Formula 1 having a number average molecular weight from about 300 to about 1,000, and a lithium salt, and an amount of the compound of Formula 1 is from about 10 parts to about 25 parts by weight based on 100 parts by weight of the polymer electrolyte:

Formula 1 wherein, in Formula 1, $R_1$ and $R_6$ are each independently a hydrogen atom, a substituted or unsubstituted C1-C30 alkyl group, a substituted or unsubstituted C6-C30 aryl group, a substituted or unsubstituted C3-C30 heteroaryl group, or a substituted or unsubstituted C3-C20 carbocyclic group;

$R_2$ to $R_5$ are each independently a hydrogen atom, a nitro group, an amino group, a hydroxy group, a halogen atom, a cyano group, a carboxyl group, a substituted or unsubstituted C1-C30 alkyl group, a substituted or unsubstituted C2-C30 alkenyl group, a substituted or unsubstituted C2-C30 alkynyl group, a substituted or unsubstituted C1-C30 alkoxy group, a substituted or unsubstituted C2-C30 alkoxycarbonyl group, a substituted or unsubstituted C6-C30 aryl group, a substituted or unsubstituted C3-C20 carbocyclic group, a substituted or unsubstituted C3-C30 heteroaryl group, a substituted or unsubstituted C2-C30 alkylcarbonyl group, a substituted or unsubstituted C7-C30 arylcarbonyl group, or a substituted or unsubstituted C4-C30 heteroarylcarbonyl group; and n is from about 5 to about 22.

According to another aspect of the present disclosure, a lithium air battery includes the above-defined protected anode, an electrolyte, and a cathode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments of a protected anode and a lithium air battery including the protected anode, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present. It will be understood that, although the terms first, second, third etc. may be used herein to describe various elements, components, regions, layers and/or sections, there elements, components, regions, layers and/or sections should not be limited by these terms. These terms are only used to distinguish one element, component, region, layer or section from another element, component, Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment of the present disclosure, a protected anode includes: an anode that intercalates and deintercalates lithium ions; a lithium ion-conductive solid electrolyte membrane; and a polymer electrolyte disposed between the anode and the lithium ion-conductive solid electrolyte membrane, The polymer electrolyte includes a lithium ion-conductive polymer, a compound represented by Formula 1 having a number average molecular weight from about 300 to about 1,000, and a lithium salt, wherein an amount of the compound of Formula 1 is from about 10 parts to about 25 parts by weight based on 100 parts by weight of a total weight of the polymer electrolyte:

Formula 1

In Formula 1, $R_1$ and $R_6$ are each independently a hydrogen atom, a substituted or unsubstituted C1-C30 alkyl group, a substituted or unsubstituted C6-C30 aryl group, a substituted or unsubstituted C3-C30 heteroaryl group, or a substituted or unsubstituted C3-C20 carbocyclic group;

$R_2$ to $R_5$ are each independently a hydrogen atom, a nitro group, an amino group, a hydroxy group, a halogen atom, a cyano group, a carboxyl group, a substituted or unsubstituted C1-C30 alkyl group, a substituted or unsubstituted C2-C30 alkenyl group, a substituted or unsubstituted C2-C30 alkynyl group, a substituted or unsubstituted C1-C30 alkoxy group, a substituted or unsubstituted C2-C30 alkoxycarbonyl group, a substituted or unsubstituted C6-C30 aryl group, a substituted or unsubstituted C3-C20 carbocyclic group, a substituted or unsubstituted C3-C30 heteroaryl group, a substituted or unsubstituted C2-C30 alkylcarbonyl group, a substituted or unsubstituted C7-C30 arylcarbonyl group, or a substituted or unsubstituted C4-C30 heteroarylcarbonyl group; and n is from about 5 to about 22, for example from about 5 to about 18, from about 5 to about 15, from about 8 to about 22, from about 8 to about 18, from about 10 to about 22, or from about 10 to about 15.

As used herein, a total weight of the polymer electrolyte refers to the sum of the weights of the lithium ion-conductive polymer, the compound of Formula 1, and the lithium salt.

The compound of Formula 1 is a low-molecular weight compound as described above, and, without being bound by theory, it is believed that the compound of Formula 1 may serve as a plasticizer in the polymer electrolyte. Accordingly, the polymer electrolyte may have improved processability.

The compound of Formula 1 may have a number average molecular weight, for example, from about 400 to about 900, from about 400 to about 800, and from about 500 to about 700. When the number average molecular weight of the compound of Formula 1 is less than 300, the compound of Formula 1 may be volatile to not form a polymer electrolyte membrane with a desired composition. When the number average molecular weight of the compound of Formula 1 is above 1,000, the polymer electrolyte may have poor film formability.

The number average molecular weights of the compounds of Formula 1 may be measured using gel permeation chromatography (GPC).

In some embodiments, the amount of the compound of Formula 1 may be from about 10 parts to about 25 parts, from about 12 parts to about 24 parts, from about 10 to about 20 parts, or from about 12 parts to about 25 parts by weight based on 100 parts by weight of the total weight of the polymer electrolyte.

When the amount of the compound of Formula 1 is less than 10 parts by weight based on 100 parts by weight of the polymer electrolyte, it may not be effective to suppress the generation and growth of a lithium dendrite, thus the lithium ionic conductivity of the polymer electrolyte may be not satisfactory. When the amount of the compound of Formula 1 is above 25 parts by weight, it is not straightforward to form the polymer electrolyte as a free standing film, and the polymer electrolyte may have poor film formability.

In the compound of Formula 1 above, $R_1$ and $R_6$ 1 may each independently be a hydrogen atom or a C1-C10 alkyl group, $R_2$ to $R_5$ may each independently be a hydrogen atom or a C1-C10 alkyl group, and n may be from about 10 to about 15.

For example, the compound of Formula 1 may be $CH_3O$—$(CH_2CH_2O)_{10}$—$CH_3$, $CH_3O$—$(CH_2CH_2O)_{11}$—$CH_3$, $CH_3O$—$(CH_2CH_2O)_{12}$—$CH_3$, $CH_3O(CH_2CH_2O)_{13}$—$CH_3$, $CH_3O$—$(CH_2CH_2O)_{14}$—$CH_3$, $CH_3O$—$(CH_2CH_2O)_{15}$—$CH_3$, $CH_3O$—$(CH_2CH_2O)_{16}$—$CH_3$, $CH_3O$—$(CH_2CH_2O)_{17}$—$CH_3$, $CH_3O$—$(CH_2CH_2O)_{18}$—$CH_3$, $CH_3O$—$(CH_2CH_2O)_{19}$—$CH_3$, $CH_3O$—$(CH_2CH_2O)_{20}$—$CH_3$, or $CH_3O$—$(CH_2CH_2O)_{21}$—$CH_3$.

An amount of the lithium ion-conductive polymer may be from about 10 parts to about 68 parts, from about 20 to about 60 parts, from about 20 to about 50 parts, or from about 30 to about 60 parts by weight based on 100 parts by weight of the total weight of the polymer electrolyte.

An amount of the lithium salt may be from about 15 parts to about 70 parts, from about 20 to about 60 parts, from about 20 to about 50 parts, from about 30 to about 65, or from about 30 to about 50 parts by weight based on 100 parts by weight of the total weight of the polymer electrolyte.

When the amounts of the lithium ion-conducting polymer and the lithium salt are within these ranges, the polymer electrolyte may have an appropriate conductivity and viscosity, and thus may exhibit improved performance, and allow lithium ions to effectively migrate.

In some embodiments, the lithium ion-conductive polymer may be a hydrophilic matrix polymer having lithium ionic conductivity.

For example, the hydrophilic matrix polymer may be at least one selected from an alkylene oxide polymer, a hydrophilic acrylic polymer, and a hydrophilic methacrylic polymer.

The alkylene oxide polymer is a polymer having an alkylene oxide molecular chain with an alternate arrangement of an alkylene group and an ether oxygen. The alkylene oxide molecular chain may be branched.

The alkylene oxide polymer may be at least one selected from polypropylene oxide, polyethylene oxide, and a polyethylene oxide/polypropylene oxide copolymer.

The lithium ion-conductive polymer may have a weight average molecular weight of about 2,000 or greater, for example, from about 2,000 to about a million, but not limited thereto. The weight average molecular weight of the lithium ion-conducting polymer may be in any ranges for suppressing the growth of lithium dendrite in a lithium air battery.

The hydrophilic acrylic polymer and the hydrophilic methacrylic polymer refer to an acrylic polymer and a methacrylic polymer that each has a hydrophilic group, respectively.

The hydrophilic group may be any functional group rendering a group hydrophilic, for example, may be a phosphoric group, a sulfonic acid group, or the like.

The lithium salt of the polymer electrolyte may be dissolved in a solvent to serve as a source of lithium ions for the lithium air battery. The lithium salt may facilitate migration of lithium ions, for example, between the anode and the lithium ion-conducting electrolyte membrane.

The lithium salt may be at least one selected from at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiF, LiBr, LiCl, LiOH, LiI, and $LiB(C_2O_4)_2$(LiBOB; lithium bis(oxalato) borate).

The amount of the lithium salt may be from about 0.01 M to about 10 M, and in some embodiments, from about 0.1 M to about 2.0 M. When the amount of the lithium salt is within these ranges, the electrolyte may have an appropriate conductivity and viscosity, and thus may improve performance of the electrolyte, and allow lithium ions to effectively migrate.

The polymer electrolyte may further include a metal salt, in addition to the lithium salt, for example, the metal salt is at least one selected from $AlCl_3$, $MgCl_2$, NaCl, KCl, NaBr, KBr, and $CaCl_2$.

The lithium ion-conductive solid electrolyte membrane may protect the anode that intercalates and deintercalates lithium ions, for example, by selectively allowing only lithium ions to pass through to prevent other materials from reacting with the anode.

According to another embodiment of the present disclosure, a lithium air battery includes one of the protected anodes according to the above-described embodiments, an electrolyte, and a cathode. In an embodiment, the cathode includes oxygen as a cathode active material.

The lithium air battery may include an aqueous electrolyte or a non-aqueous electrolyte, as the electrolyte disposed between the cathode and the protected anode.

A reaction mechanism in the lithium air battery including a non-aqueous electrolyte is represented in Reaction Scheme 1.

Reaction Scheme 1

During discharging, lithium from the anode reacts with oxygen from the cathode to form lithium oxide, and oxygen is reduced ("oxygen reduction reaction (ORR)"). On the contrary, during charging, the lithium oxide is reduced to generate oxygen ("oxygen evolution reaction (OER)").

An operating principle of a lithium air battery according to an embodiment of the present disclosure will now be described with reference to FIG. 1.

Figure 1:
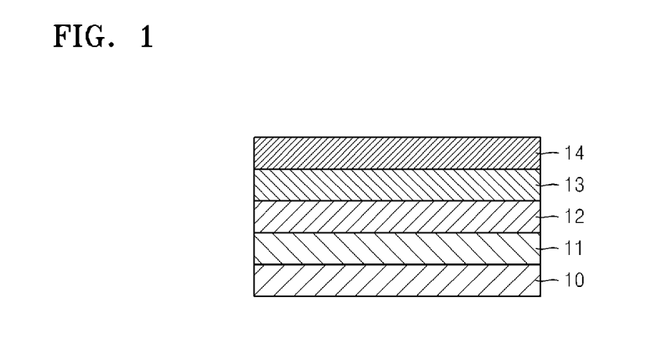
FIG. 1 is a schematic view of a structure of a lithium air battery according to an embodiment of the present disclosure.

Referring to FIG. 1, a lithium air battery according to an exemplary embodiment includes a structure with a lithium ion-conductive solid electrolyte membrane 12 disposed between a cathode 10 and an anode 14. An anode electrolyte 13 is disposed between the anode 14 and the lithium ion-conductive solid electrolyte membrane 12. The anode electrolyte 13 includes one of the polymer electrolytes according to the above-described embodiments.

The anode 14, the anode electrolyte 13, and the lithium ion-conductive solid electrolyte membrane 12 may constitute a protected anode.

The anode electrolyte 13 may have good lithium ionic conductivity and a low resistance per a unit area against the anode 14.

In some embodiments, the anode electrolyte 13 may include a compound of Formula 1 having a number average molecular weight from about 300 to about 1,000, for example, a polyethyleneglycol dimethylether (e.g., $CH_3O$—$(CH_2CH_2O)n$-$CH_3$, where n is 10); polyethylene oxide as a lithium ion-conductive polymer; and lithium bis(trifluoromethanesulfonyl)imide (LiTFSI) as a lithium salt. An amount of the compound of Formula 1 may be from about 10 parts to about 25 parts, or about 12 parts to about 24 parts by weight based on 100 parts by weight of a total weight of the anode electrolyte.

The compound of Formula 1, for example, polyethylene glycol dimethylether, has an ethylene oxide chain that may be coordinated by lithium ions to allow lithium ions to be arranged within the ethylene oxide chain. This arrangement of lithium ions may form a path of lithium ions during charging and discharging and may lead to a more uniform current density distribution on an anode surface. As a result, the creation and growth of lithium dendrite on the anode surface may be suppressed. Consequently, an interface between the lithium anode and a layer adjacent to the lithium anode may be stabilized. In addition, the mobility of lithium ions in the electrolyte may be increased, thus improving durability, lifetime, and conductivity of the lithium air battery.

The lithium ion-conductive polymer, for example, polyethylene oxide, and the compound of Formula 1, for example, polyethylene glycol dimethylether, which are adsorbed on the surface of the lithium anode, may be reversibly adsorbed onto or desorbed from the surface of the lithium anode during repeated charging and discharging to maintain the anode surface uniformity, thus stabilizing the lithium anode.

The anode electrolyte 13 can be the polymer electrolyte of the protected anode. The polymer electrolyte may have a thickness from about 5 μm to about 150 μm. When the thickness of the polymer electrolyte is within this range, the formation or growth of lithium dendrite on the anode may be effectively suppressed without a decrease in mobility of lithium ions.

A cathode electrolyte 11 is disposed between the lithium ion-conductive solid electrolyte membrane 12 and the cathode 10. The cathode electrolyte 11 may include a solvent and a lithium salt.

The solvent may include at least one of an aprotic solvent and water.

Non-limiting examples of the aprotic solvent are a carbonate solvent, an ester solvent, an ether solvent, a ketone solvent, an amine solvent, and a phosphine solvent.

Non-limiting examples of the carbonate solvent are dimethyl carbonate (DMC), diethyl carbonate (DEC), ethyl methyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

Non-limiting examples of the ester solvent are methyl acetate, ethyl acetate, n-propyl acetate, dimethyl acetate, methyl propionate (MP), ethyl propionate, γ-butyrolactone, decanolide, valerolactone, mevalonolactone, and caprolactone.

Non-limiting examples of the ether solvent are dibutyl ether, tetraglyme, diglyme, dimethoxyethane, 2-methyltetrahydrofuran, and tetrahydrofuran. An example of the ketone solvent is cyclohexanone.

Non-limiting examples of the amine solvent are triethylamine and triphenylamine. An example of the phosphine solvent is triethylphosphine. The embodiments of the present disclosure are not limited to the above, and any appropriate aprotic solvent available in the art may be used.

Examples of the aprotic solvent are nitriles such as R—CN, wherein R is a C2-C30 linear, branched, or cyclic hydrocarbon moiety that may include an double-bond, an aromatic ring, or an ether bond, amides such as N,N-dimethylformamide, dioxolanes such as 1,3-dioxolane, and sulfolanes.

The aprotic solvent may be used alone or in a combination of at least two solvents. In the latter, a mixing ratio of the at least two aprotic solvents may be appropriately adjusted depending on a desired performance of the battery. This will be obvious to one of ordinary skill in the art.

The anode electrolyte or the cathode electrolyte may include an ionic liquid.

Non-limiting examples of the ionic liquid include at least one cation selected from linear or branched substituted ammonium, linear or branched substituted imidazolium, linear or branched substituted pyrrolidinium, and piperidinium, and at least one anion selected from $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The electrolyte between the lithium ion-conductive solid electrolyte membrane and the cathode may be partially or fully impregnated into the cathode.

In some embodiments, the anode electrolyte 13 of the lithium air battery may be the polymer electrolyte of a protected anode. The polymer electrolyte may be prepared as follows.

A lithium ion-conductive polymer, a compound of Formula 1, a lithium salt, and a solvent may be mixed together to form a polymer electrolyte forming composition, which may then be cast on a substrate and dried at a temperature of about 40° C. to 90° C., for example, at about 60° C., for about 10 minutes or longer, thereby preparing the polymer electrolyte.

The substrate may be a glass substrate, a mylar film, a polyethylene terephthalate (PET) film, or the like.

The solvent may be acetonitrile. An amount of the solvent may be from about 100 parts to about 2000 parts, from about 200 parts to about 1800 parts, from about 400 parts to about 1500 parts, from about 400 parts to about 1000 parts, from about 300 parts to about 1900 parts by weight based on 100 parts by weight of the lithium ion-conductive polymer. When the amount of the solvent is within this range, the polymer electrolyte may have improved film formability.

The cathode, using oxygen as a cathode active material, may include a conductive material. The conductive material may be porous. Any porous and conductive material may be used as a cathode active material, and in some embodiments, a porous carbonaceous material may be used. Suitable carbonaceous materials include carbon blacks, graphites, graphenes, activated carbons, carbon fibers, and a combination thereof. The cathode active material may be a metallic conductive material, for example, a metal fiber, a metal mesh, or the like. For example, the cathode active material may be metal powder of copper, silver, or nickel, aluminum. Organic conductive materials, including polyphenylene derivatives, may be used. The above-listed conductive materials may be used alone or in a combination.

The cathode may further include an organometallic catalyst that facilitates oxidation or reduction of oxygen. Examples of the catalyst include, but are not limited to, precious metal catalysts, such as platinum (Pt), gold (Au), silver (Ag), palladium (Pd), ruthenium (Ru), rhodium (Rh), and osmium (Os); oxide catalysts, such as manganese oxide, iron oxide, cobalt oxide, and nickel oxide; and organometallic catalysts, such as cobalt phthalocyanine. Any appropriate oxidation and reduction catalyst for oxygen available in the art may be used.

The catalyst may be supported on a support. Examples of the support are oxide, zeolite, clay mineral, and carbon. The oxide may include at least one oxide of alumina, silica, zirconium oxide, and titanium dioxide. The oxide may be an oxide bearing at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon available as the support are, but are not limited to, carbon blacks, such as ketjen black, acetylene black, channel black, and lamp black; graphites, such as natural graphite, artificial graphite, and expanded graphite; activated carbons; and carbon fibers. Any appropriate material available as supports in the art may be used.

The cathode may further include a binder. The binder may include a thermoplastic resin or a thermocurable resin. Examples of the binder include, but are not limited to, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in a combination. Any appropriate binder available in the art may be used.

To manufacture the cathode, an oxygen oxidation/reduction catalyst, a conductive material, and a binder may be mixed, and then may be added to an appropriate solvent to prepare a cathode slurry. The cathode slurry may be coated and dried on a surface of a current collector, optionally followed by press-molding to improve an electrode density, thereby forming the cathode. The cathode may optionally include a lithium oxide. The oxygen oxidation/reduction catalyst may be optionally omitted.

A porous body in a matrix or mesh form may be used as the current collector to facilitate diffusion of oxygen. A porous metal plate made of, for example, stainless steel, nickel, or aluminum may be used. Materials for the current collector are not particularly limited, and any appropriate material for current collectors available in the art may be used. The current collector may be coated with an anti-oxidation metal or an alloy coating layer to prevent oxidation.

In some embodiments the lithium-containing anode of the lithium air battery may include a lithium metal, a lithium metal alloy, or a material that accepts and releases lithium. Materials for the anode are not particularly limited to these materials, any material including Li or any material that accepts and releases lithium that is available in the art may be used. The anode determines the capacity of the lithium air battery. In this regard, the anode may be a lithium metal. Examples of the lithium alloy include alloys with aluminum (Al), tin (Sn), magnesium (Mg), indium (In), calcium (Ca), titanium (Ti), vanadium (V), and a combination thereof.

A separator (not shown) may be disposed between the cathode and the anode. The separator is not specifically limited, and may have any composition durable in an operation environment of the lithium air battery. For example, the separator may be at least one selected from a polymer non-woven fabric, such as polypropylene non-woven fabric, or polyphenylene sulfide non-woven fabric, and a porous film of an olefin polymer, such as polypropylene or polyethylene.

The lithium ion-conductive solid electrolyte membrane may be disposed on a surface of the anode to serve as a protective layer for protecting lithium of the anode from an electrolyte.

The lithium ion-conductive solid electrolyte membrane may include at least one selected from an inorganic material and a polymer solid electrolyte.

The lithium ion-conductive solid electrolyte membrane may be a glass-ceramic solid electrolyte, or a laminated structure of a glass-ceramic solid electrolyte and a polymer solid electrolyte. The lithium ion-conductive solid electrolyte membrane will now be described in greater detail.

The lithium ion-conductive solid electrolyte membrane may include an inorganic material including lithium ion-conductive glass, a lithium ion-conductive crystal, for example, ceramic or glass-ceramic or a mixture thereof. For example, the lithium ion-conductive solid electrolyte membrane may include an oxide, in view of chemical stability.

When the lithium ion-conductive solid electrolyte membrane includes a large amount of lithium ion-conductive crystals, a high ionic conductivity may be attainable. For example, the lithium ion-conductive solid electrolyte membrane may include about 50 wt % or greater, about 55 wt % or greater, or about 60 wt % or greater of lithium ion-conductive crystals, based on a total weight of the lithium ion-conductive solid electrolyte membrane.

The lithium ion-conductive crystals may be lithium-ion conductive crystals having a Perovskite structure, such as $Li_3N$, LISICON, $La_{0.55}Li_{0.35}TiO_3$, and the like, $LiTi_2P_3O_{12}$ crystals having a NASICON structure, or a glass-ceramic that forms these crystals.

For example, the lithium ion-conductive crystals may be $Li_{1+x+y}(Al, Ga)_x(Ti, Ge)_{2-x}Si_yP_{3-y}O_{12}$ crystals where $0 \leq x \leq 1$, and $0 \leq y \leq 1$, and for example, $0 \leq x \leq 0.4$ and $0 < y \leq 0.6$, or $0.1 \leq x \leq 0.3$ and $0.1 < y \leq 0.4$. To have high ionic conductivity, the lithium-ion conductive particles may be free of grain boundaries that may interrupt ionic conduction. For example, a lithium ion-conductive glass-ceramic free of pores or grain boundaries that impair conduction of ions may have high ionic conductivity and high chemical stability.

Non-limiting examples of the lithium ion-conductive glass-ceramic are lithium-aluminum-germanium-phosphate (LAGP), lithium-aluminum-titanium-phosphate (LATP), and lithium-aluminum-titanium-silicon-phosphate (LATSP).

For example, when a parent glass with a composition of $Li_2O$—$Al_2O_3$—$TiO_2$—$SiO_2$—$P_2O_5$ is thermally treated for crystallization, a main crystal phase of $Li_{1+x+y}Al_xTi_{2-x}Si_yP_{3-y}O_{12}$ wherein $0 \leq x \leq 1$ and $0 \leq y \leq 1$ may be obtained. For example, $0 \leq x \leq 0.4$ and $0 < y \leq 0.6$, and in some embodiments, $0.1 \leq x \leq 0.3$ and $0.1 < y \leq 0.4$.

As used herein, the pores or grain boundaries blocking conduction of ions refer to pores or grain boundaries that lower the conductivity of the entire inorganic material including lithium ion-conductive crystals to $\frac{1}{10}$ or less of the conductivity of the lithium ion-conductive crystals of the inorganic material.

The terms "glass-ceramic" refers to a material obtained by thermally treating glass to form crystalline phases from glass phases in the glass, the glass-ceramic including amorphous solid and crystals. The glass-ceramic may also refer to a material completely phase-transitioned from glass phases to crystalline phases, for example, a material with a 100 wt % crystallization degree. In some embodiments the glass-ceramic may include a material having a 100 wt % crystallization degree. The glass-ceramic includes nearly zero pores among crystal particles or in a crystal even when 100% crystallized.

Since the lithium ion-conductive solid electrolyte membrane includes a large amount of glass-ceramic, a high ionic conductivity may be obtained. The lithium ion-conductive solid electrolyte membrane may include about 80 wt % or greater of lithium ion-conductive glass-ceramic, and in some embodiments, about 85 wt % or greater, or about 90 wt % or greater to obtain high ionic conductivities.

A $Li_2O$ component in the glass-ceramic may serve as a $Li^+$ ion carrier, and is an effective component for lithium-ion conductivity. To obtain a high ionic conductivity, an amount of the $Li_2O$ component may be about 12 wt %, about 13 wt %, or about 1th %. When the amount of the $Li_2O$ component is too high, thermal stability of the glass-ceramic, and conductivity of the glass-ceramic may be highly likely to deteriorate. Accordingly, an upper limit in the amount of the $Li_2O$ component may be about 18 wt %, 17 wt %, or 16 wt %.

An $Al_2O_3$ component in the glass-ceramic may improve thermal stability of the parent glass, and may improve lithium-ion conductivity by being present as $Al^{3+}$ ions in a crystal phase. To facilitate these effects, a lower limit in the amount of the $Al_2O_3$ component may be about 5 wt %, about 5.5 wt %, or about 6 wt %. When the amount of the $Al_2O_3$ component exceeds 10%, thermal stability of the glass-ceramic, and conductivity of the glass-ceramic may be highly likely to deteriorate. Accordingly, an upper limit in the amount of the $Al_2O_3$ component may be about 10 wt %, 9.5 wt %, or 9 wt %.

A $TiO_2$ component in the glass-ceramic, as a component in a crystal phase, is an effective component involved in formation of glass and the crystal phase. To facilitate glass formation and to form as a main crystal phase thereof on the glass to obtain higher ionic conductivity, a lower limit in the amount of the $TiO_2$ component may be about 35 wt %, 36 wt %, or 37 wt %. When the amount of the $TiO_2$ component is too high, thermal stability of the glass-ceramic, and conductivity of the glass-ceramic may be highly likely to deteriorate. Accordingly, an upper limit in the amount of the $Al_2O_3$ component may be about 45 wt %, 43 wt %, or 42 wt %.

A $SiO_2$ component in the glass-ceramic may improve melting properties and thermal stability of the parent glass, and may improve lithium-ion conductivity by being present as $Si^{4+}$ ions in a crystal phase. To facilitate these effects, a lower limit in the amount of the $SiO_2$ component may be about 1 wt %, about 2 wt %, or about 3 wt %. When the amount of the $SiO_2$ component is too high, conductivity of the glass ceramic may be highly likely to deteriorate. Accordingly, an upper limit in the amount of the $SiO_2$ component may be about 10 wt %, 8 wt %, or 7 wt %.

A $P_2O_5$ component in the glass-ceramic, as a component in a crystal phase, is an effective component involved in formation of glass and the crystal phase. When an amount of the $P_2O_5$ component is less than about 30 wt %, glassification formation may not occur. Accordingly, a lower limit in the amount of the $P_2O_5$ component may be about 30 wt %, 32 wt %, or 33 wt %. When the amount of the $P_2O_5$ component exceeds 40 wt %, the crystal phase may not be educed from glass, and desired characteristics may not be attainable. Accordingly, an upper limit in the amount of the $P_2O_5$ component may be about 40 wt %, 39 wt %, or 38 wt %.

When the glass-ceramic has the above-composition, glass may be formed by casting molten glass, and the glass-ceramic in a crystal phase obtained by thermally treating the glass may have a high lithium-ion conductivity of about $1 \times 10^{-3}$ S·cm$^{-1}$.

When a glass-ceramic having a similar crystalline structure as above, not the same composition as above, is used, the $Al_2O_3$ component and the $TiO_2$ component may be partially or fully substituted with a $Ga_2O_3$ component and a $GeO_2$ component, respectively. In some other embodiments, to lower a melting point of glass-ceramic or to improve the stability of glass, a trace of an additional material may be used in a range of amounts not to seriously deteriorate ionic conductivity.

The lithium ion-conductive solid electrolyte membrane may further include a polymer solid electrolyte, in addition to the glass-ceramic. For example, the polymer solid electrolyte may be a polyethylene oxide doped with a lithium salt. The polymer solid electrolyte may include at least one selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

The polymer solid electrolyte membrane may form a laminated structure with the glass-ceramic. The glass-ceramic may be disposed between the polymer solid electrolytes.

As described above, the lithium ion-conductive solid electrolyte membrane may be disposed on a surface of the anode that intercalates and deintercalates lithium ions to protect the anode from reacting with a first electrolyte and allow only lithium ions selectively to pass through.

The lithium ion-conductive solid electrolyte membrane may be used as a single layer or layers.

An electrolyte may be disposed between the anode and the lithium ion-conductive solid electrolyte membrane.

For example, the electrolyte between the anode and the lithium ion-conductive solid electrolyte membrane may be a liquid electrolyte including a non-aqueous solvent and a lithium salt, an inorganic solid electrolyte membrane, such as $Cu_3N$, $Li_3N$, or LiPON, a polymer electrolyte membrane, or a combination thereof.

The non-aqueous solvent may include an aprotic solvent as described above, an d a compound represented by Formula 1 above.

In some embodiments, the lithium air battery may further include at least one intermediate layer (not shown) between the anode and the lithium ion-conductive solid electrolyte membrane, the at least one intermediate layer being selected from among a liquid electrolyte including a non-aqueous solvent and a lithium salt, an inorganic solid electrolyte membrane, a polymer solid electrolyte membrane, a combination thereof, and a separator.

In some other embodiments, a separator (not shown) and/or an electrolyte may be disposed between the lithium ion-conductive solid electrolyte membrane and the cathode.

According to the above-described embodiments, the lithium air battery may include a protected anode suppressing the formation of lithium dendrite on the anode surface to have a uniform current density distribution on the anode surface, and thus may be improved in stability, conductivity, and charge/discharge characteristics.

As used herein, the term "air" is not limited to atmospheric air, and may refer to a combination of gases including oxygen, or pure oxygen gas. This broad definition of "air" also applies to other terms, including "air battery," and "air electrode."

The lithium air battery is available either as a lithium primary battery or a lithium secondary battery. The lithium air battery may have any of various shapes, and in some embodiments, may have a shape like a coin, a button, a sheet, a stack, a cylinder, a plane, or a horn. The lithium air battery may be applicable as a large battery for electric vehicles.

Substituents in the formulae above may be defined as follows.

As used herein, the term "alkyl" indicates a completely saturated, branched or unbranched (or a straight or linear) hydrocarbon.

Non-limiting examples of the "alkyl" group include methyl, ethyl, n-propyl, isopropyl, n-butyl, isobutyl, sec-butyl, t-butyl, isopentyl, neopentyl, iso-amyl, n-hexyl, 3-methylhexyl, 2,2-dimethylpentyl, 2,3-dimethylpentyl, and n-heptyl.

At least one hydrogen atom in the alkyl group may be substituted with a C1-C30 alkyl group substituted with a halogen atom, for example, $CCF_3$, $CHCF_2$, $CH_2F$, $CCl_3$, or the like, a C1-C30 alkoxy group, a C2-C30 alkoxyalkyl group, a hydroxy group, a nitro group, a cyano group, an amino group, an alkylamino group, an amidino group, a hydrazine, a hydrazone, a carboxyl group or a salt thereof, a sulfonyl group, a sulfamoyl group, a sulfonic acid group or a salt thereof, a phosphoric acid group or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C6-C30 heteroaryl group, a C7-C30 heteroarylalkyl group, a C6-C30 heteroaryloxy group, a C7-C30 heteroaryloxyalkyl group, or a C7-C30 heteroarylalkyl group.

The term "halogen atom" indicates fluorine, bromine, chloride, iodine, and the like.

As used herein, the term "alkoxy" indicates "alkyl-O-", wherein the alkyl is the same as described above. Non-limiting examples of the alkoxy group are methoxy, ethoxy, propoxy, 2-propoxy, butoxy, t-butoxy, pentyloxy, and hexyloxy. At least one hydrogen atom of the alkoxy group may be substituted with substituents that are the same as those recited above in conjunction with the alkyl group.

The "unsubstituted alkenyl group" indicates an unsaturated alkyl groups having at least one carbon-carbon double bond in the center or at a terminal of the alkyl group. Examples of the alkenyl group are an ethenyl group, a propenyl group, a butenyl group, and the like. At least one hydrogen atom in the unsubstituted alkenyl group may be substituted with a substituent described above in conjunction with the alkyl group.

The "unsubstituted alkynyl group" indicates an alkyl group having at least one carbon-carbon triple bond in the center or at a terminal of the alkyl group. At least one hydrogen atom in the alkynyl group may be substituted with a substituent described above in conjunction with the alkyl group.

Non-limiting examples of the unsubstituted or substituted alkynyl group are acetylene, propylene, phenylacetylene, naphthylacetylene, isopropylacetylene, t-butylacetylene, and diphenylacetylene.

As used herein, the term "aryl" group, which is used alone or in combination, indicates an aromatic hydrocarbon containing at least one ring.

The term "aryl" is construed as including a group with an aromatic ring fused to at least one cycloalkyl ring.

Non-limiting examples of the "aryl" group are phenyl, naphthyl, and tetrahydronaphthyl.

At least one hydrogen atom in the aryl group may be substituted with the same substituents as described above in conjunction with the alkyl group.

The "heteroaryl group" used herein indicates a carbocyclic aromatic organic group including at least one heteroatom selected from nitrogen (N), oxygen (O), phosphorous (P), and sulfur (S). The heteroaryl group may include, for example, one to five heteroatoms, and in some embodiments, may include a five- to ten-membered ring. In the heteroaryl group, S or N may be present in various oxidized forms.

Non-limiting examples of a heteroaryl group include a monocyclic heteroaryl group such as thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

The term "heteroaryl" also indicates a group having a heteroaromatic ring fused to at least one of an aryl group, a cycloaliphatic group, and a heterocyclic group.

The term "heterocyclic" group indicates a cyclic group that has atoms of at least two different elements as members of its ring.

Non-limiting examples of a bicyclic heteroaryl group are indolyl, isoindolyl, indazolyl, indolizinyl, purinyl, quinolizinyl, quinolinyl, and isoquinolinyl. At least one hydrogen atom of the heteroaryl group may be substituted with the same substituent as those described above in conjunction with the alkyl group.

The term "sulfonyl" indicates R"—SO$_2$—, wherein R" is a hydrogen atom, alkyl, aryl, heteroaryl, aryl-alkyl, heteroarylalkyl, alkoxy, aryloxy, cycloalkyl, or a heterocyclic group.

The term "sulfamoyl" group refers to H$_2$NS(O$_2$)—, alkyl-NHS(O$_2$)—, (alkyl)$_2$NS(O$_2$)-aryl-NHS(O$_2$)—, alkyl-(aryl)-NS(O$_2$)—, (aryl)$_2$NS(O)$_2$, heteroaryl-NHS(O$_2$)—, (arylalkyl)-NHS(O$_2$)—, or (heteroaryl-alkyl)-NHS(O$_2$)—.

At least one hydrogen atom of the sulfamoyl group may be substituted with substituents that are the same as those described above in conjunction with the alkyl group.

The term "amino group" indicates a group with a nitrogen atom covalently bonded to at least one carbon or hetero atom. The amino group may refer to, for example, —NH$_2$ or substituted moieties.

The term "alkylamino group" also refers to an "alkylamino group" with nitrogen bound to at least one additional alkyl group, and "arylamino" and "diarylamino" groups with at least one or two nitrogen atoms bound to a selected aryl group.

The term "carbocylic group" indicates a cyclic ring having 5 to 10 carbon atoms, such as a cyclohexyl group. At least one hydrogen atom in the carbocyclic group may be substituted with the same substituent as those described above in connection with the alkyl group.

The term "alkoxycarbonyl" indicates an —C(O)—O-alkyl group in which alkyl is as defined herein. The alkyl group is preferably a $C_{1-6}$ alkyl group. Non-limiting examples of alkoxycarbonyl include methoxycarbonyl and ethoxycarbonyl.

The term "arylcarbonyl" indicates an —C(O)—O-aryl group in which aryl is as defined herein.

The term "heteroarylcarbonyl" indicates an —C(O)—O-heteroaryl group in which heteroaryl is as defined herein.

The alkoxycarbonyl group, the arylcarbonyl group, and the heteroarylcarbonyl group may also be substituted with the same substituents as those described above in conjunction with the alkyl group.

Hereinafter, one or more embodiments of the present disclosure will be described in detail with reference to the following examples. These examples are not intended to limit the purpose and scope of the one or more embodiments of the present disclosure.

EXAMPLE 1

Manufacture of Lithium Symmetric Cell 1.38 g of polyethylene oxide powder (having a weight average molecular weight of about 600,000, available from Aldrich) and 0.256 g of polyethylene glycol dimethylether (PEGDME, CH$_3$O—(CH$_2$CH$_2$O)$_{10}$—CH$_3$, having a number average molecular weight of about 500 g/mol) were dispersed in an acetonitrile (AN) solvent, followed by adding 1M Li(CF$_3$SO$_2$)$_2$N (LiTFSI, available from Wako) to reach a mole ratio of Li to O of about 1:18. The mixture was stirred for about 24 hours to obtain an electrolyte forming composition. The amount of the polyethylene glycol dimethylether was about 12 parts by weight based on 100 parts by weight of a total weight of the polyethylene oxide, polyethylene glycol dimethylether, and Li(CF$_3$SO$_2$)$_2$N. The amount of the polyethylene oxide was about 65 parts by weight based on 100 parts by weight of the total weight of the polyethylene oxide, polyethylene glycol dimethylether, and Li(CF$_3$SO$_2$)$_2$N.

The stirred electrode forming composition was cast on a Teflon dish, and then dried at about 20° C. for 24 hours to remove the AN solvent, and further dried in a vacuum at about 80° C. for about 12 hours to obtain a PEO$_{18}$LiTFSl-PEGDME polymer electrolyte having an average thickness of about 60 μm, which was then impregnated with a 1M LiTFSI-dissolved dimethylether (DME) solution to manufacture a target polymer electrolyte.

Lithium electrodes having a diameter of about 15 mm and a thickness of about 500 μm were disposed on opposite surfaces of the polymer electrolyte, and then fixed thereto, thereby manufacturing a lithium symmetric cell having the symmetric lithium electrodes.

EXAMPLES 2-3

Manufacture of Lithium Symmetric Cell

Polymer electrolytes were manufactured in the same manner as in Example 1, except that the amount of the polyethylene glycol dimethylether was changed as in Table 1 below.

EXAMPLE 4

Manufacture of Beaker-cell (Li/PEO$_{18}$LiTFSl-18 wt % PEGDME/LTAP/10M LiCl-2 mM LiOH)

1.38 g of polyethylene oxide powder (having a weight average molecular weight of about 600,000, available from Aldrich) and 0.413 g of polyethylene glycol dimethylether (PEGDME, CH$_3$O—(CH$_2$CH$_2$O)$_{10}$—CH$_3$, having a number average molecular weight of about 500 g/mol) were dispersed in an acetonitrile (AN) solvent, followed by adding 1M Li(CF$_3$SO$_2$)$_2$N (LiTFSI, available from Wako) to reach a mole ratio of Li to O of about 1:18. The mixture was stirred for about 24 hours to obtain an electrolyte forming composition. The amount of the polyethylene glycol dimethylether was about 18 parts by weight based on 100 parts by weight of a total weight of the polyethylene oxide, polyethylene glycol dimethylether, and Li(CF$_3$SO$_2$)$_2$N. The amount of the polyethylene oxide was about 60 parts by weight based on 100 parts by weight of the total weight of the polyethylene oxide, polyethylene glycol dimethylether, and Li(CF$_3$SO$_2$)$_2$N.

The stirred electrode forming composition was cast on a Teflon dish, and then dried at about 20° C. for 24 hours to remove the AN solvent, and further dried in a vacuum at about 80° C. for about 12 hours to obtain a PEO$_{18}$LiTFSI-PEGDME polymer electrolyte having an average thickness of about 60 μm, which was then impregnated with a 1M LiTFSI-dissolved dimethylether (DME) solution to manufacture a target polymer electrolyte having a thickness of about 120 μm.

When a lithium metal disposed on a surface of the polymer electrolyte, a LTAP (Li$_{1.4}$Ti$_{1.6}$Al$_{0.4}$P$_3$O$_{12}$) solid electrolyte membrane having a thickness of about 150 μm was disposed on the opposite surface of the polymer electrolyte, and then the resultant was wrapped in an aluminum pouch having a thickness of about 20 μm to manufacture a structure with a window formed of the LTAP solid electrolyte membrane.

An aluminum film of which a part is formed of LATP was prepared by forming a hole having a size of 1 cm×1 cm in a center of a polypropylene coated aluminum film having a size of 5 cm×5 cm and then filling the hole with a LATP film (Ohara corporation) of a size of 1.4 cm×1.4 cm by using adhesives.

After injecting a liquid electrolyte through the window of the structure, a Pt electrode as a cathode was stacked thereon to manufacture a beaker-cell.

50 mL of a mixed aqueous solution of LiCl and LiOH was used as the liquid electrolyte. The concentration of LiCl was about 10M, and the concentration of LiOH was about 2 mM.

EXAMPLE 5

Manufacture of Beaker-cell (Li/PEO$_{18}$LiTFSl-18 wt % PEGDME/LTAP/1M LiCl-4 mM LiOH)

A beaker-cell was manufactured in the same manner as in Example 4, except that the concentration of LiCl and the concentration of LiOH in the mixed aqueous solution used as liquid electrolyte were about 1 M and about 4 mM, respectively.

COMPARATIVE MANUFACTURE EXAMPLE 1

Manufacture of Lithium Symmetric Cell

A lithium symmetric cell was manufactured in the same manner as in Example 1, except that a polymer electrolyte was prepared using an electrolyte forming composition not containing polyethylene glycol dimethylether, as shown in Table 1.

COMPARATIVE MANUFACTURE EXAMPLES 2-3

Manufacture of Lithium Symmetric Cells

Lithium symmetric cells were manufactured in the same manner as in Example 1, except that the amount of polyethylene glycol dimethylether was changed to prepare each polymer electrolyte, as shown in Table 1.

In Comparative Manufacture Example 1, forming a free standing polymer electrolyte was impossible.

TABLE 1

| Example | Amount of polyethylene glycol dimethylether* (Parts by weight) |
|---|---|
| Example 1 | 12 |
| Example 2 | 18 |
| Example 3 | 24 |
| Comparative Example 1 | 0 |
| Comparative Example 2 | 27 |
| Comparative Example 3 | 6 |

*Amounts based on 100 parts by weight of a total weight of polyethylene oxide, polyethylene glycol dimethylether, and Li(CF$_3$SO$_2$)$_2$N.

EVALUATION EXAMPLE 1

Evaluation of Physical Characteristics of Polymer Electrolytes

Figure 2:
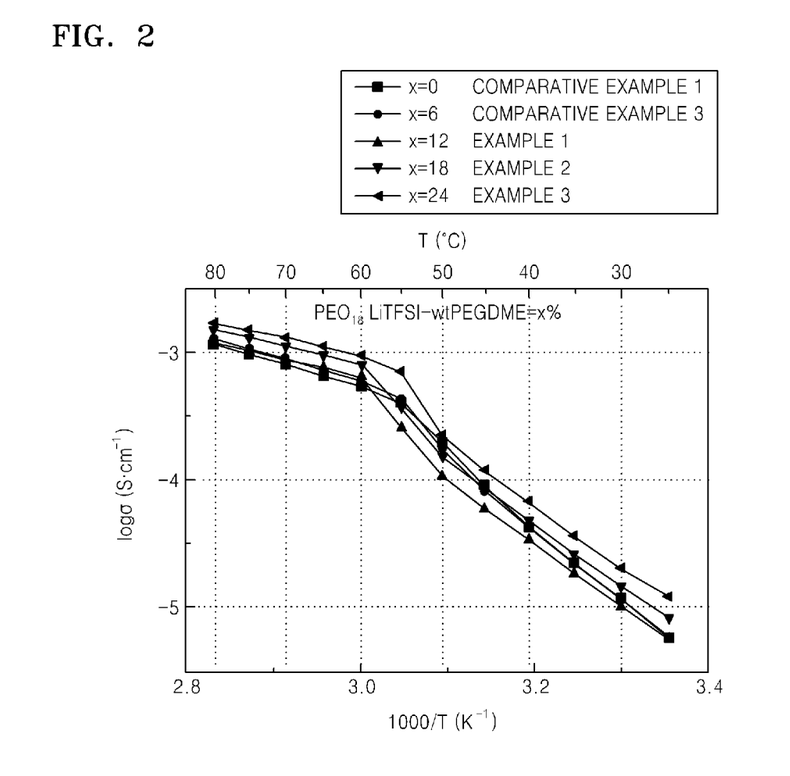
FIG. 2 is a graph of conductivity with respect to temperature in polymer electrolytes of Examples 1 to 3, Comparative Example 1 and Comparative Example 3.

Ionic conductivities (σ), lithium ionic conductivities ($\sigma_{Li}^+$), and lithium ion transfer coefficients ($t_{Li}$) of the polymer electrolytes of Examples 1 to 3 and Comparative Examples 1 and 3 at 25° C., 30° C., 35° C. 40° C., 45° C., 50° C., 55° C., 60° C., 65° C., 70° C., 75° C., and 80° C. were calculated. Some of the results are shown in Table 2. FIG. 2 is a graph of conductivity with respect to temperature in the polymer electrolytes of Examples 1 to 3 and Comparative Examples 1 and 3.

The ionic conductivities (σ), lithium ionic conductivities ($\sigma_{Li}^+$), and lithium ion transfer coefficients ($t_{Li}$) of the polymer electrolytes were calculated using Equations 1 and 2, respectively. The impedance of each of the lithium symmetric cells and current decay with respect to input voltage and time were measured and used to calculate the ionic conductivities (σ), lithium ionic conductivities ($\sigma_{Li}^+$)), and lithium ion transfer coefficients ($t_{Li}$).

$$\sigma = l/(R_b \cdot A) \quad \text{Equation 1}$$

In Equation 1, I denotes a thickness of the polymer electrolyte, A denotes an area of the cell, and $R_b$ denotes an impedance of the cell.

$$t_{Li} = \frac{I_{SS}(V - I_0 R_0)}{I_0(V - I_{SS} R_{SS})} \quad \text{Equation 2}$$

In Equation 2, $I_o$ denotes an initial current, $I_{ss}$ denotes a steady-state current, $R_o$ denotes an initial resistance, and $R_{ss}$ denotes a steady-state resistance.

TABLE 2

| Example | Ionic conductivity (σ) [S/cm] Temperature (° C.) | | Lithium ionic conductivity ($\sigma_{Li}^+$) Temperature (° C.) | | Lithium ion transfer coefficient ($t_{Li}$) |
|---|---|---|---|---|---|
| | 25 ($\times 10^{-6}$) | 60 ($\times 10^{-4}$) | 25 ($\times 10^{-6}$) | 60 ($\times 10^{-4}$) | |
| Example 1 | 9 | 2.7 | 6.3 | 2.9 | 0.46 |
| Example 2 | 8.3 | 4.0 | 7.9 | 3.8 | 0.48 |
| Example 3 | 12.1 | 6.5 | 9.1 | 4.9 | 0.54 |
| Comparative Example 1 | 5.6 | 1.3 | 5.3 | 1.3 | 0.24 |
| Comparative Example 3 | 5.9 | 2.2 | 6.1 | 2.3 | 0.38 |

Referring to Table 2, the polymer electrolytes of Examples 1 to 3 were found to have improved ionic conductivities, improved lithium ionic conductivities, and improved lithium ion transfer coefficients compared with those of the polymer electrolytes of Comparative Examples 1 and 3. The improvement in lithium ion transfer coefficient may suppress the growth of lithium dendrite.

EVALUATION EXAMPLE 2

Impedance Characteristic Measurement

Impedance characteristics of the lithium symmetric cells of Example 2 and Comparative Example 1 were evaluated using an impedance measurement device (Materials mates 7260, available from Materials Mates). The operation temperature of each cell was maintained at about 60° C. The results of analyzing impedance with respect to storage time are shown in FIGS. 3 and 4.

Figure 3:
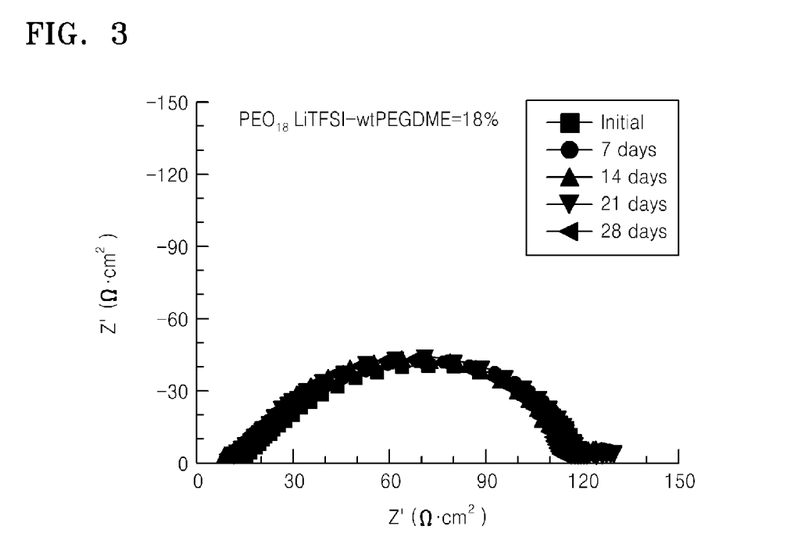
FIG. 3 is a graph of impedance with respect to storage time in a lithium symmetric cell of Example 2.
Figure 4:
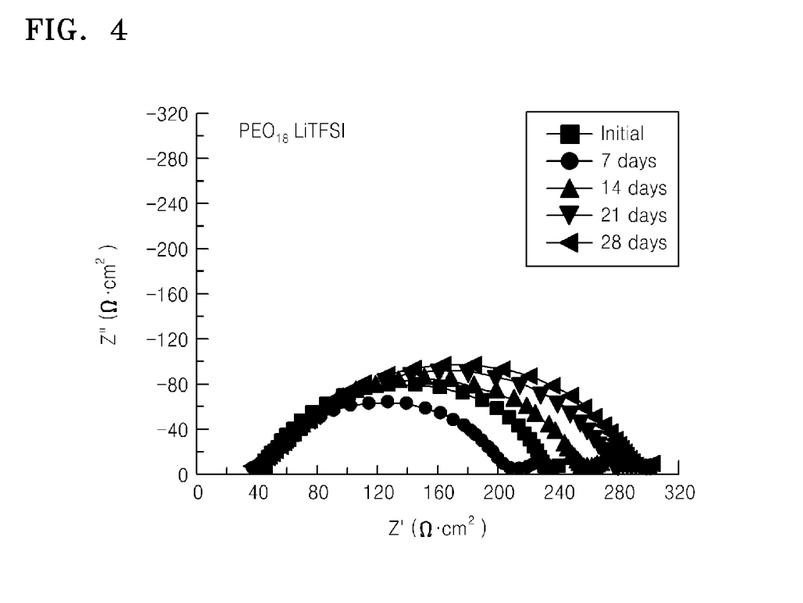
FIG. 4 is a graph of impedance with respect to storage time in a lithium symmetric cell of Comparative Example 1.

FIGS. 3 and 4 illustrate the impedance characteristics of the lithium symmetric cells of Example 2 and Comparative Example 1, respectively, at an initial stage and after 7 days, 14 days, 21 days, and 28 days.

In FIGS. 3 and 4, the size (diameter) of a half circle corresponds to a magnitude of electrode resistance ($R_a$). Referring to FIGS. 3 and 4, the lithium symmetric cell of Example 1 was found to have relatively low electrode resistances compared with those of the lithium symmetric cell of Comparative Example 1.

EVALUATION EXAMPLE 3

Evaluation of Discharge Characteristics of Lithium Air Battery

Voltage changes in the lithium air batteries of Example 2 and Comparative Example 1 at 60° C. were measured after polarization at about 50 mV. The results are shown in FIG. 5.

Figure 5:
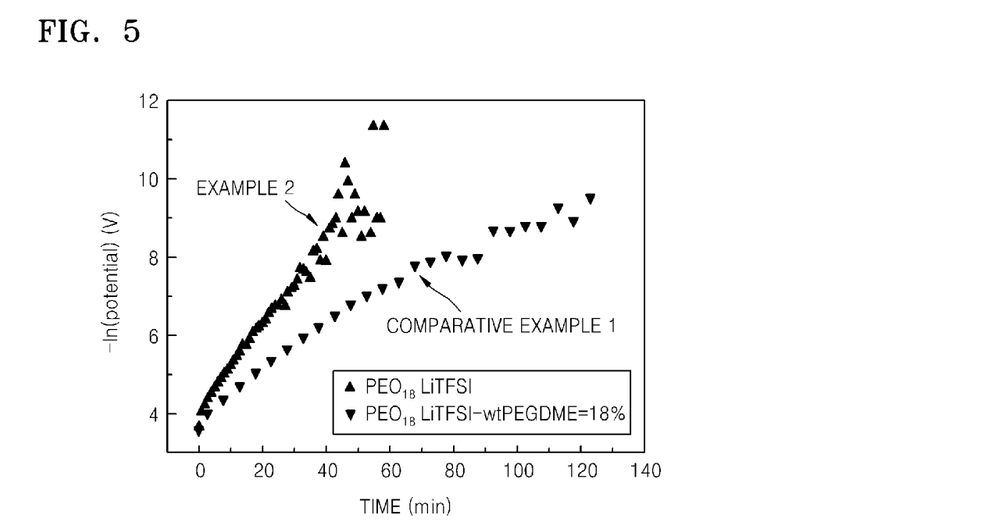
FIG. 5 is a graph illustrating discharge characteristics of the lithium symmetric calls of Example 2 and Comparative Example 1.

Referring to FIG. 5, the lithium air battery of Example 2 was found to have improved polarization characteristics compared with the lithium air battery of Comparative Example 1.

EVALUATION EXAMPLE 4

Evaluation of Discharge Characteristics of Beaker-cell

The beaker-cell of Example 4 was discharged at about 60° C. with a constant current of about 1.0 mA/cm² for about 23 hours. The results are shown in FIG. 6.

Figure 6:
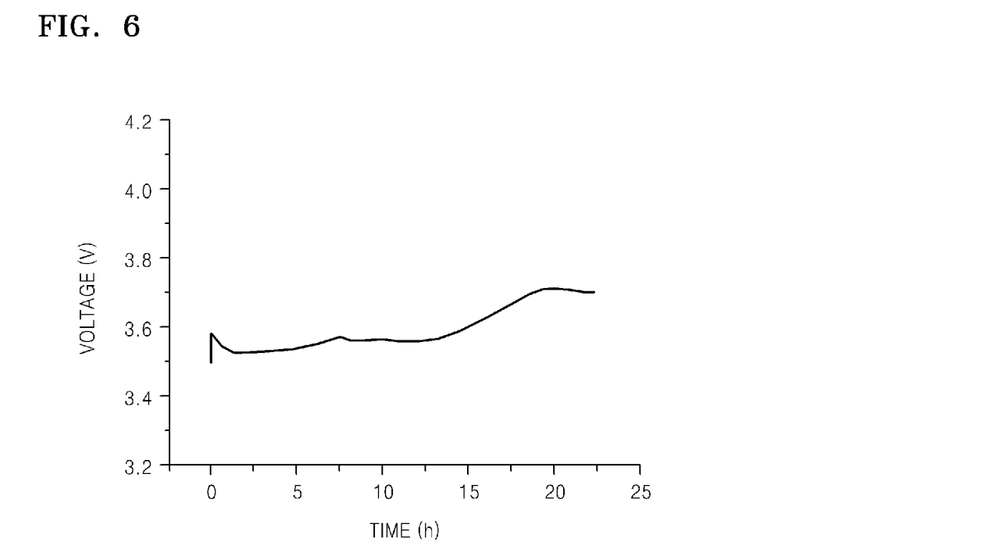
FIG. 6 is a graph illustrating discharge characteristics of a beaker-cell of Example 4.

Referring to FIG. 6, the beaker-cell of Example 4 was found to exhibit stable discharge characteristics in the constant current condition.

EVALUATION EXAMPLE 5

Cycle Characteristic Evaluation

A charging/discharging cycle was repeated about 15 times or more using the beaker-cell of Example 5 by applying a constant current of about 1.0 mA/cm² at about 60° C. for 2 hours. Voltage changes in the beaker-cell over time were observed. A Pt/Air electrode was used as a reference electrode. The results are shown in FIG. 7.

Figure 7:
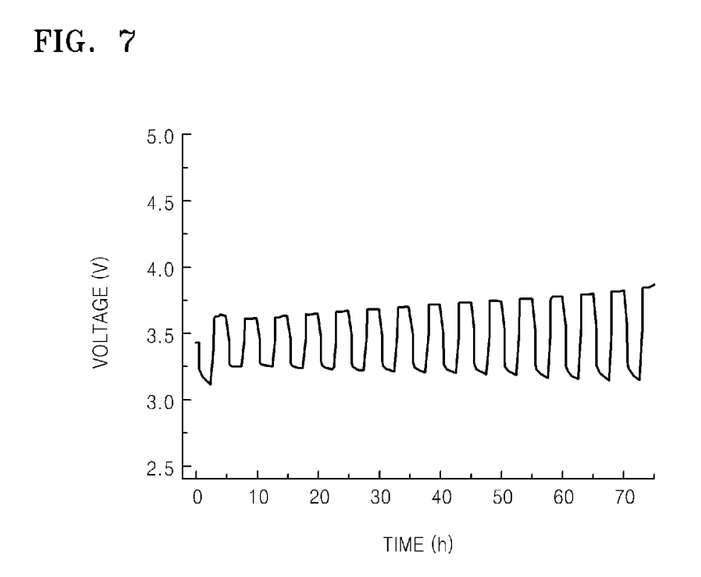
FIG. 7 is a graph illustrating charge-discharge characteristics of a beaker-cell of Example 5.

Referring to FIG. 7, the beaker-cell of Example 5 was found to exhibit stable charge-discharge characteristics.

As described above, according to the one or more of the above embodiments of the present disclosure, a protected anode may suppress the growth of dendrite on anode surfaces and may have a uniform current density distribution on surfaces. A lithium air battery with improvements in stability, conductivity, and charge-discharge characteristics may be manufactured using the protected anode.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A protected anode for a lithium air battery comprising:
an anode;
a lithium ion-conductive solid electrolyte membrane; and
a polymer electrolyte disposed between the anode and the ion-conductive solid electrolyte membrane,
wherein the polymer electrolyte comprises a lithium ion-conductive polymer, a compound represented by Formula 1 having a number average molecular weight from about 300 to about 1,000, and a lithium salt, and an amount of the compound of Formula 1 is from about 10 parts to about 25 parts by weight based on 100 parts by weight of the polymer electrolyte:

Formula 1 wherein, in Formula 1, $R_1$ and $R_6$ are each independently a hydrogen atom, a substituted or unsubstituted C1-C30 alkyl group, a substituted or unsubstituted C6-C30 aryl group, substituted or unsubstituted C3-C30 heteroaryl group, or a substituted or unsubstituted C3-C20 carbocyclic group;

$R_2$ to $R_5$ are each independently a hydrogen atom, a nitro group, an amino group, a hydroxy group, a halogen atom, a cyano group, a carboxyl group, a substituted or unsubstituted C1-C30 alkyl group, a substituted or unsubstituted C2-C30 alkenyl group, a substituted or unsubstituted C2-C30 alkynyl group, a substituted or unsubstituted C1-C30 alkoxy group, a substituted or unsubstituted C2-C30 alkoxycarbonyl group, a substituted or unsubstituted C6-C30 aryl group, a substituted or unsubstituted C3-C20 carbocyclic group, a substituted or unsubstituted C3-C30 heteroaryl group, a substituted or unsubstituted C2-C30 alkylcarbonyl group, a substituted or unsubstituted C7-C30 arylcarbonyl group, or a substituted or unsubstituted C4-C30 heteroarylcarbonyl group; and n is from about 5 to about 22.

2. The protected anode of claim 1, wherein $R_1$ and $R_6$ in Formula 1 are each independently a hydrogen atom or a C1-C10 alkyl group, and $R_2$ to $R_5$ are each independently a hydrogen atom or a C1-C10 alkyl group.

3. The protected anode of claim 1, wherein the compound of Formula 1 is $CH_3O-(CH_2CH_2O)_{10}-CH_3$, $CH_3O-(CH_2CH_2O)_{11}-CH_3$, $CH_3O-(CH_2CH_2O)_{12}-CH_3$, $CH_3O-(CH_2CH_2O)_{13}-CH_3$, $CH_3O-(CH_2CH_2O)_{14}-CH_3$, $CH_3O-(CH_2CH_2O)_{15}-CH_3$, $CH_3O-(CH_2CH_2O)_{16}-CH_3$, $CH_3O-(CH_2CH_2O)_{17}-CH_3$, $CH_3O-(CH_2CH_2O)_{18}-CH_3$, $CH_3O-(CH_2CH_2O)_{19}-CH_3$, $CH_3O-(CH_2CH_2O)_{20}-CH_3$, or $CH_3O-(CH_2CH_2O)_{21}-CH_3$.

4. The protected anode of claim 1, wherein an amount of the lithium ion-conductive polymer is from about 10 parts to about 68 parts by weight based on 100 parts by weight of the polymer electrolyte.

5. The protected anode of claim 1, wherein the lithium ion-conductive polymer is at least one selected from an alkylene oxide polymer, a hydrophilic acrylic polymer, and a hydrophilic methacrylic polymer.

6. The protected anode of claim 1, wherein the lithium ion-conductive polymer is at least one selected from polypropylene oxide, polyethylene oxide, and a polyethylene oxide/polypropylene oxide copolymer.

7. The protected anode of claim 1, wherein an amount of the lithium salt is from about 15 parts to about 70 parts by weight based on 100 parts by weight of the polymer electrolyte.

8. The protected anode of claim 1, wherein the polymer electrolyte has a thickness from about 5 μm to about 150 μm.

9. The protected anode of claim 1, wherein the lithium salt is at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiF, LiBr, LiCl, LiOH, LiI, and $LiB(C_2O_4)_2$.

10. The protected anode of claim 1, wherein the lithium ion-conductive solid electrolyte membrane comprises at least one selected from an inorganic material and a polymer solid electrolyte.

11. The protected anode of claim 1, wherein the lithium ion-conductive solid electrolyte membrane is a glass-ceramic solid electrolyte, or a laminated structure of a glass-ceramic solid electrolyte and a polymer solid electrolyte.

12. The protected anode of claim 1, wherein the polymer electrolyte membrane further comprises at least one selected from a metal salt selected from $AlCl_3$, $MgCl_2$, NaCl, KCl, NaBr, KBr, and $CaCl_2$.

13. A lithium air battery comprising the protected anode of claim 1, an electrolyte, and a cathode.

14. The lithium air battery of claim 13, wherein the electrolyte comprises a lithium salt and a non-aqueous solvent.

15. The lithium air battery of claim 13, wherein the cathode comprises a porous carbonaceous material.

16. The lithium air battery of claim 13, wherein the protected anode comprises:
an anode that intercalates and deintercalates lithium ions;
a lithium ion-conductive solid electrolyte membrane; and
a polymer electrolyte disposed between the anode and the ion-conductive solid electrolyte membrane,
wherein the polymer electrolyte comprises a polyethyleneglycol dimethylether $CH_3O-(CH_2CH_2O)_n-CH_3$ where n is 10; polyethylene oxide as a lithium ion-conductive polymer; and lithium bis(trifluoromethanesulfonyl)imide as a lithium salt.

* * * * *